Patented Jan. 11, 1949

2,459,124

UNITED STATES PATENT OFFICE 2,459,124

MANUFACTURE OF CHLORINE DIOXIDE

George M. Booth, Westfield, N. J., assignor to Novadel-Agene Corporation, Belleville, N. J., a corporation of Delaware No Drawing. Application October 20, 1947, Serial No. 781,007

9 Claims. (Cl. 23—152)

This invention relates to a method of producing chlorine dioxide, which is an energetic oxidizing agent having important industrial and other uses. Under the conditions at which it is customarily employed chlorine dioxide is a gas, and moreover has a tendency to decompose, usually with explosive violence, unless handled with considerable care. For convenience and safety, a preferred practice is to produce chlorine dioxide at the locality of its use, and in fact to generate it only as required, so that there is no need to store the gas for any length of time or to package it for transportation. As a further safeguard against explosion and against other harm that might result from inadvertent release of the pure reagent, it is ordinarily diluted to a large extent with other gas which is suitably inert to chlorine dioxide and also inert, so far as necessary, to all materials that must be exposed to the diluted mixture.

For most purposes, a satisfactory method of making chlorine dioxide should be one that is easily controlled, without expert attention, and that uses commercially available materials and can be carried out with simple, inexpensive equipment.

It has heretofore been known that chlorine dioxide is formed by suitably reacting potassium chlorate with sulfuric acid, and another previously proposed method is to treat sodium chlorite with chlorine gas, but practical disadvantages or obstacles involved in the use of these prior methods have indicated a need for other procedure to make chlorine dioxide, specifically procedure satisfying requirements of the sort indicated above.

The present invention embraces the discovery that chlorine dioxide may be produced by reacting nitrogen trichloride with sodium chlorite. The products of this reaction include not only the desired chlorine dioxide but also sodium chloride which remains behind while the principal product is withdrawn; and a gaseous constituent, carried off with the chlorine dioxide. If the reaction is effected in the presence of substantial amounts of water, i. e. where the sodium chlorite is in solution, the following is understood to represent the chemical operation:

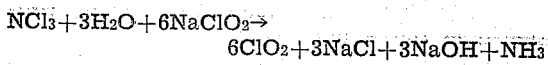

It will be noted that in addition to chlorine dioxide the evolved gas includes ammonia, which may under some circumstances provide a further suitable diluent for the chlorine dioxide. At the same time sodium hydroxide is also a reaction product, and if the procedure is to be performed under these specific circumstances, e. g. with the chlorite in solution, the sodium hydroxide should not be allowed to accumulate to any substantial concentration.

That is to say, the presence of substantial amounts of sodium hydroxide gives rise to a reverse reaction, tending to reconvert chlorine dioxide to sodium chlorite and thus to prevent effective occurrence of the desired reaction. Instead of physically separating sodium hydroxide from the solution, a further and particularly important feature of the invention resides in preventing an accumulation of sodium hydroxide in the reaction zone, by keeping the chlorite substantially dry. In other words, it has been discovered that by using dry sodium chlorite and passing nitrogen trichloride, e. g. in gaseous form, into contact with it, chlorine dioxide is effectively evolved in accordance with the following equation:

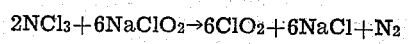

Although the last stated reaction requires twice as much nitrogen trichloride as the wet type of operation to produce a given amount of chlorine dioxide from the sodium chlorite, the dry procedure is believed to be much easier to control and to be generally much simpler in practice.

Eminently satisfactory yields have been obtained by following the preferred, dry method, and it has a still further, specific advantage in that it can be conveniently carried out with not more than a little modification of apparatus now available for making nitrogen trichloride. Moreover, the only additional gas produced is nitrogen, which is appropriately inert under practically all circumstances of use of chlorine dioxide.

Although nitrogen trichloride may be made or supplied in other ways, a particularly convenient practice is to generate it, for example by reaction of chlorine with ammonium chloride, at the site of the desired manufacture and use of chlorine dioxide. More specifically one effective method of producing nitrogen trichloride is by mixing chlorine water with ammonium chloride solution and then bubbling a diluent gas up through the solution to entrap and carry off the nitrogen trichloride. The diluent gas can be supplied through a suitable diffuser at the bottom of the mixing tank, affording fine bubbles for most efficient removal of the evolved reagent. Although other diluents may be used, such as carbon dioxide, nitrogen and the like, air has been found to be peculiarly suitable at least because it is most economical, and is at present preferred in actual practice of the invention. In the specific examples mentioned below, carbon dioxide was employed, but only because its separation (e. g. in caustic) and measurement are easier and thus facilitated the analysis which was one of the objects of the described tests.

The proportions of chlorine and ammonium chloride may follow practices heretofore used in making nitrogen trichloride. For instance excellent results in cooperation with the present process were obtained by mixing 0.1 N chlorine water (3550 ppm. $Cl_2$) with an equal volume of ammonium chloride solution, the latter containing, say, ammonium chloride somewhat in excess of that which would theoretically react with the chlorine. In the first of the tests mentioned below, the ammonium chloride was 500% in excess of theory, but a solution containing only 10% excess was found to be more stable and was used in the other tests noted.

In carrying out the present process, the sodium chlorite, at least in a more or less divided form, may be disposed in suitable enclosures into which the diluted nitrogen trichloride is continuously passed and from which the gaseous products are continuously withdrawn. As a result of thus bringing the reactants into effective contact with each other, the described reaction takes place and the exit gas is found to contain an eminently satisfactory proportion of chlorine dioxide, with the accompaniment, under proper control, of little or no nitrogen trichloride. For instance, the amount and distribution of the sodium chlorite (depending upon its fineness of sub-division), and the rate of supply of nitrogen trichloride can be readily determined in any given instance and especially in view of specific examples set forth below, so as to yield a gaseous product which consists essentially of an inert diluent having a desired content of chlorine dioxide and effectively free of other active agents.

Indeed, the principal control can be effected simply by regulating the rate of nitrogen trichloride production, e. g. by adjustments of the same sort as would be used in obtaining a desired flow of the latter for other purposes, it being understood that the nitrogen trichloride can be produced wholly continuously or with intermittent periods of flow from corresponding batch treatments. The ultimate chlorine dioxide, even as diluted, usually has a distinctive yellowish color, which may constitute an approximate measure for control purposes or at least for judging whether substantial amounts of the product are being evolved or whether it is time to replenish one or another of the reactants.

When the nitrogen trichloride is derived from a reaction in solution as described above, the moisture carried along with it and the diluent gas tends to be absorbed or condensed by the sodium chlorite, so that the mass of the latter in the enclosure through which the gas travels may become decidedly damp or moist after a period of time. Although at such time it may also actually be necessary to replace the solid material because it has mostly been converted to sodium chloride, tests have indicated that the damp condition of the chlorite itself does not seriously affect the reaction, i. e. to the extent of requiring separation of sodium hydroxide as would be necessary if the chlorite were treated in solution.

Accordingly, and unless statement to the contrary appears, references herein to the use of substantially dry sodium chlorite, or to keeping it substantially free of water, do not exclude situations where is acquires moisture in the manner just explained or where it may exist in a moist condition for considerable periods, as distinguished from the presence of ample water, e. g. in the use of a solution, for occurrence of the reaction first stated hereinabove. Indeed it may be that the presence of some moisture is to be preferred for best results with the present, so-called dry process.

By way of more specific example, the results of the following tests are believed to be indicative of the exact nature and amount of the reaction products under various circumstances. In these tests the nitrogen trichloride was generated and delivered in a diluent gas (carbon dioxide) as explained above, the $NCl_3$ content of the gaseous mixture being of the average order of a few percent, but in fact decreasing from beginning to end of each test because of the use of a batch method of generation. The diluted gas was passed through a glass tube containing the sodium chlorite, which was in a powdered or granular form, well exposed to the gaseous reactant, and the effluent gas was suitably treated and collected for analysis. For instance, the chlorine dioxide and unconsumed nitrogen trichloride were removed together in absorption bottles containing sodium bisulfite solution, while the carbon dioxide was absorbed by potassium hydroxide solution at a further stage; the remaining gas in each instance was found to be nitrogen, as expected.

The following tabulation sets forth amounts of materials used, consumed and produced, and other details of operation, in certain specific tests identified by the letters A to E inclusive:

| Test | A | B | C | D | E |
|---|---|---|---|---|---|
| Gas Flow, cc./min | 25 | 5 | 5 | 5 | 5. |
| Duration of Run | 50 min. | 3 hrs. | 3 hrs. | 3 hrs. | 3 hrs. |
| Grams chlorite put in chamber. | 1.056 | 1.186 | 1.228 | 1.197 | 2.328. |
| Grams chlorite consumed. | .447 | .327 | .666 | .638 | 1.572. |
| Grams $NCl_3$ supplied to chamber. | .308 | .218 | .259 | .273 | .553. |
| Grams $NCl_3$ collected | .054 | .025 | .007 | .022 | .004. |
| Grams $ClO_2$ collected | .304 | .186 | .312 | .327 | .636. |
| Percent $NCl_3$ in $NCl_3+ClO_2$ content of exit gases. | 15 | 12 | 2.2 | 6.3 | 0.6. |

In tests A and B the sodium chlorite was of so-called chemically pure grade (c. p.) while in tests C, D and E it was of the technical grade.

In all cases the chlorite was in the form of fine crystals or was ground to considerable fineness, and was held in place in the treatment tube or tubes with plugs of glass wool.

In each test appropriate analyses were made to determine the amount of sodium chlorite remaining after the run, and consequently the amount consumed, and also to determine the amounts of nitrogen trichloride and chlorine dioxide collected, i. e. contained in the exit gas mixture. The amount of nitrogen trichloride supplied to the chlorite reaction chamber was similarly determined by computation and analysis, e. g. from the amount of reagents consumed in the equipment making $NCl_3$ and the amount of the latter produced but not withdrawn. Whereas a single treatment tube or chamber was used in each of tests A to D, test E involved the use of a series of separate cylindrical chambers through which the gas traveled in succession. Ten such chambers were used, it being found that practically all of the chlorite was consumed in the first four, and successively less proportions in the remainder.

As demonstrated by the tests the method is useful to generate effective quantities of chlorine dioxide and can be controlled to yield an essentially pure product, e. g. practically free, if desired, from nitrogen trichloride or other active contaminant. Thus in tests C and E the absolute amount of nitrogen trichloride in the exit gas was trifling, and especially in test E, it was in a negligible proportion relative to the chlorine dioxide. Based on the amount of nitrogen trichloride used the yields were good, e. g. about 70 to 75% in tests C to E inclusive, even though impaired by the fact that the NCl₃ was not generated continuously and therefore some was lost because of side reactions. Likewise on the basis of the chlorite consumed the yield was equally good, ranging from 93 to 64%. Athough other tests indicated that some of the nitrogen trichloride decomposes and evolves a small amount of nitrogen independently of the desired reaction, there is no very serious effect on the yield, nor other apparent detriment to the process.

As will be further evident from the above table, the rate of production of chlorine dioxide or its freedom from nitrogen trichloride, or both, may be considerably regulated by adjusting the rate of supply of the latter gas to the reaction zone. For instance, it appears that to eliminate NCl₃ from the exit gas under the circumstances of the above tests, the rate of supply of incoming gaseous mixture containing 5% NCl₃ by volume had to be less than 4 cc. per minute per gram of chlorite. In practice, there may be several reaction chambers in series, which are successively advanced in position (in a countercurrent direction) as exhausted chambers are replenished and reinserted at the end of the line; in this way lost time for replacement of chlorite is minimized while a maximum consumption of the material (e. g. practically 100% as found in the first chambers of test E) is obtained.

The described procedures, including the preferred operation using solid chlorite, may be carried out in like manner with other chlorites than the sodium salt, to yield chlorine dioxide by reaction with nitrogen trichloride; thus for instance, according to present experience and understanding, a particularly significant class to which the process extends is that of the alkali-metal and alkaline-earth metal chlorites, of which convenient specific examples are sodium, potassium, calcium and magnesium chlorites. Sodium chlorite, however, is at present greatly to be preferred.

It is to be understood that the invention is not limited to the specific procedures herein described but may be carried out in other ways without departure from its spirit as defined by the following claims.

I claim:

1. A method of producing chlorine dioxide comprising reacting nitrogen trichloride with sodium chlorite.

2. A method of producing chlorine dioxide comprising passing successive quantities of nitrogen trichloride into contact with sodium chlorite to react therewith, while preventing accumulation of sodium hydroxide in the presence of the sodium chlorite.

3. A method of producing chlorine dioxide comprising passing successive quanities of gaseous nitrogen trichloride into contact with sodium chlorite to react therewith and removing from the reaction zone successively produced quantities of chlorine dioxide in gaseous form, while preventing accumulation of sodium hydroxide in the presence of the sodium chlorite, by maintaining the reaction zone substantially free of water which would enter the reaction to produce sodium hydroxide.

4. A method of producing chlorine dioxide comprising reacting nitrogen trichloride with sodium chlorite while maintaining the sodium chlorite substantially dry.

5. The method of claim 4 wherein the nitrogen trichloride is supplied to the sodium chlorite in gaseous form and in admixture with diluent gas, and wherein chlorine dioxide, evolved by the reaction, is withdrawn from the reaction zone in a gaseous mixture containing diluent gas, the rate of supply of nitrogen trichloride to the sodium chlorite being controlled so that the withdrawn gaseous mixture is substantially free of nitrogen trichloride.

6. A method of producing chlorine dioxide comprising establishing a supply of a gaseous mixture comprising nitrogen trichloride carried in a diluent gas, passing said gaseous mixture into contact with substantially dry sodium chlorite for reaction therewith to produce chlorine dioxide and withdrawing gas from the reaction zone, including said chlorine dioxide and diluent gas, said passage of the gaseous mixture to the sodium chlorite being controlled to limit the quantity of nitrogen trichloride so that the withdrawn gas contains not more than a relatively small amount of said nitrogen trichloride.

7. A method of producing chlorine dioxide comprising reacting nitrogen trichloride with a chlorite.

8. A method of producing chlorine dioxide comprising reacting nitrogen trichloride with a solid chlorite of the class consisting of the chlorites of the alkali metals and the alkaline earth metals.

9. A method of producing chlorine dioxide comprising passing a mixture of nitrogen trichloride and a diluent gas into contact with a quantity in divided form, of a solid chlorite of the class consisting of the chlorites of the alkali metals and the alkaline earth metals, for reaction to generate chlorine dioxide, and withdrawing from the reaction zone a gaseous mixture comprising said chlorine dioxide and said diluent gas.

GEORGE M. BOOTH.

No references cited.